ately forming a pocket therebetween for the reception of the plates N. (See Fig. 2.) The back member below the pintles I and also the front or gate member are U-shaped, and each comprise the vertical side portions above referred to and an integral horizontal bottom

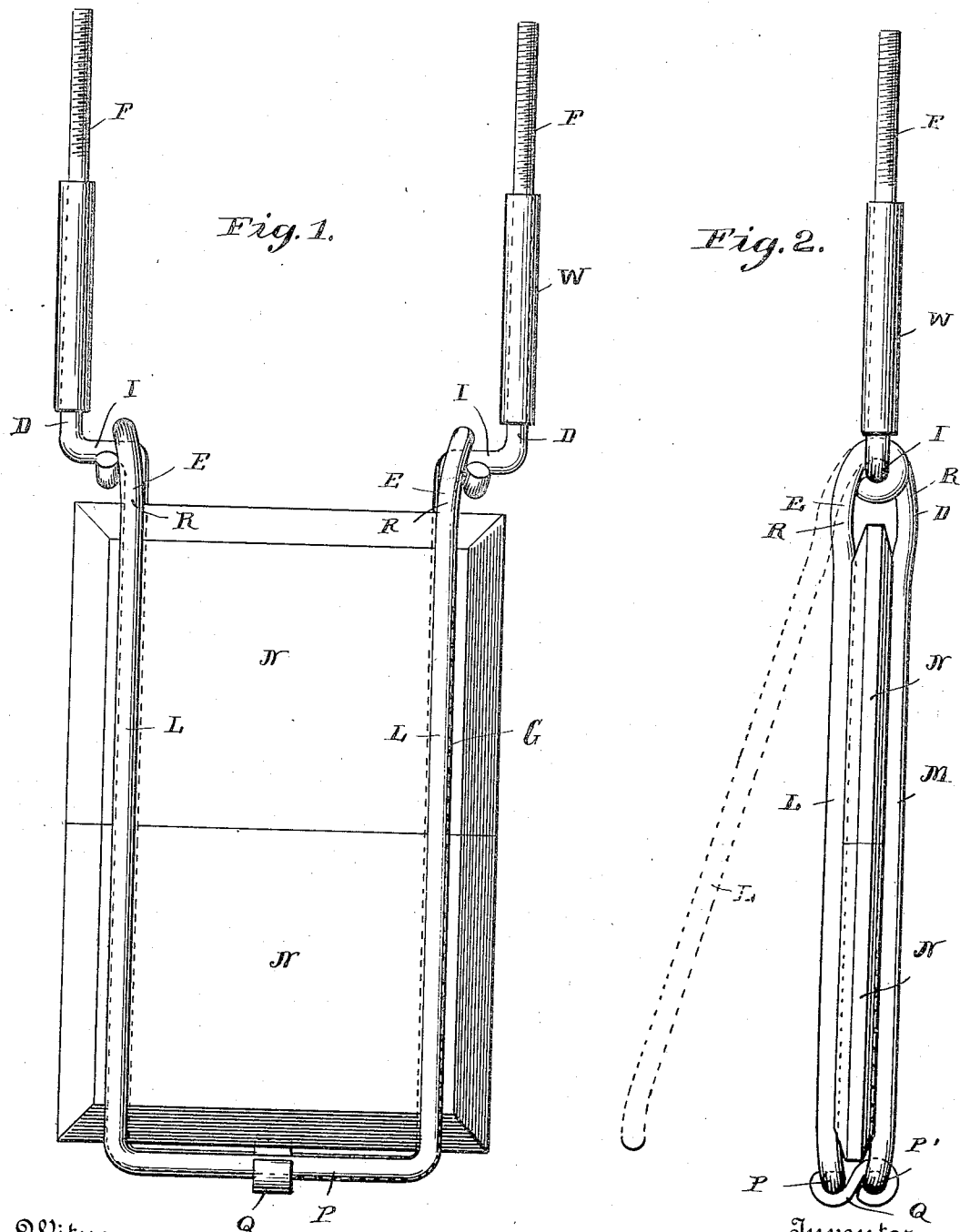

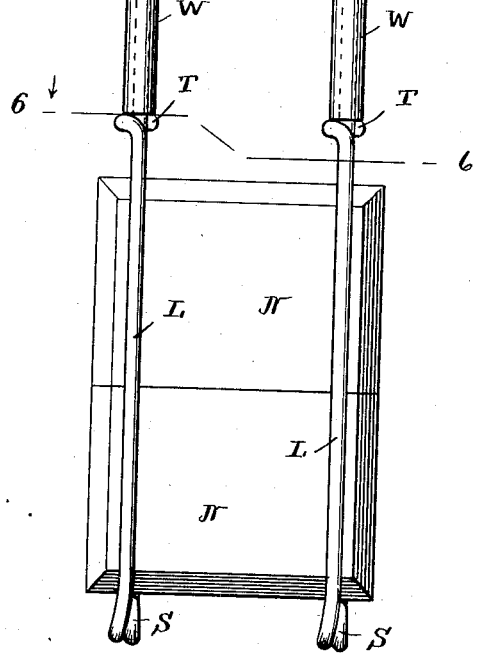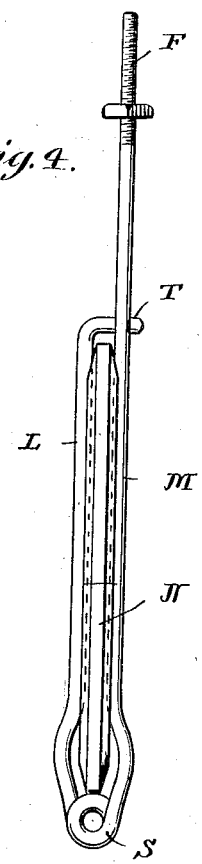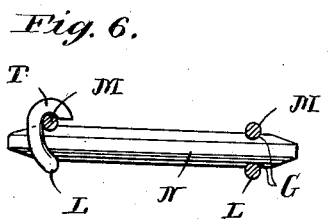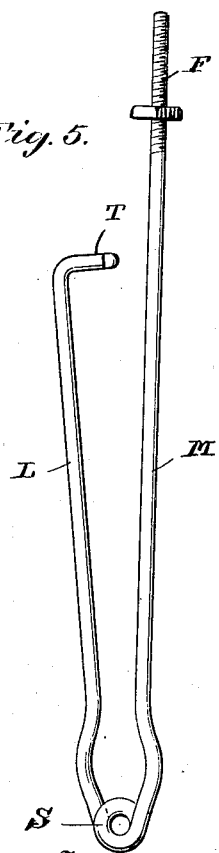

UNITED STATES PATENT OFFICE.

WILLIAM G. C. KRAUSE, OF WATERBURY, CONNECTICUT, ASSIGNOR TO CHARLES B. SCHOENMEHL.

BATTERY-PLATE.

No. 848,559.  Specification of Letters Patent.  Patented March 26, 1907.

Application filed June 24, 1905. Serial No. 266,901.

*To all whom it may concern:*

Be it known that I, WILLIAM G. C. KRAUSE, a citizen of the United States, and a resident of Waterbury, in the county of New Haven and State of Connecticut, have invented certain new and useful Improvements in Battery-Plates, of which the following is a specification.

My invention relates to new and useful improvements in element supports or holders for primary batteries, and is used to retain the negative elements or plates in position in a jar, and which plates are commonly manufactured of oxid of copper by being first molded and pressed into shape and then baked. These compressed copper-oxid plates obviously form the negative element of a battery and as such when in use become exhausted, and consequently have to be replaced by new ones from time to time in the recharging of the battery. Several different styles of frames or holders for plates of this class are now to be found upon the market; but all of these are more expensive to manufacture than my present device, and it is also more difficult and consumes a greater amount of time to place plates in or remove them from such frames than is the case with my device.

The purpose of this invention is to produce a new style of supporting-frame for these compressed copper plates, which frame will be simple in construction, inexpensive to manufacture, and especially adapted for the convenient attachment and removal of said plates as occasion may require in the use and operation of a battery.

Referring to the accompanying two sheets of drawings, forming a part of this specification, similar character of reference denote like or corresponding parts throughout the several figures, and of which—

Figure 1 shows a side elevation of the preferred construction of my invention, the same being detached from a cover and containing a pair of copper plates therein. Fig. 2 is an edge view of the holder and plates shown in Fig. 1. Fig. 3 shows, on a reduced scale, a further side elevation of a slightly-different form of plate-holder embodying my invention. Fig. 4 is an edge view of Fig. 3. Fig. 5 is a similar edge view, the holder being in an open position and the plates removed. Fig. 6 is a cross-section taken on line 6 6 of Fig. 3.

This class of plate-holders are generally supported from the battery-jar cover and are removable therewith from the jar, and the same is true of my present construction. It is also true of my device that the plates can be inserted or removed without the detachment of the holder from the cover.

In carrying out my invention I employ a holder the construction of which is such as to engage the opposite sides or faces of the plates, preferably adjacent to their side or vertical edges. This holder is constructed on the clamp principle, being formed of round spring-wire bent into the desired shape to form a pocket to receive the plates. It is also provided with means for holding the side portions in a clamped position and further contains integral means for its attachment to a cover.

Referring in detail to the characters of reference marked upon the drawings, A indicates a cover which although represented as being formed of porcelain may be of any preferred material and construction best adapted to meet the requirements of the maker. This class of cover usually contains holes similar to those indicated by B B and through which I elect to attach my plate-holder. The central hole C is also shown in the cover A and serves for the attachment of the coacting zinc element of the battery.

My holder proper is formed of two main supports, of wire, with suitable means to hold them in a clamped position. In my preferred form of construction (shown in Figs. 1 and 2) I have shown the holder formed of back and front pieces or supports D and E, hinged together. These are made of round spring-wire, the back member D having its straight shank portions F F threaded to receive nuts for the attachment of the holder to the cover, as in the manner shown in Fig. 3. This member D contains a right-angular bent portion I in each vertical side to form a pintle upon which the gate member E is hinged. Both side portions of the rigid back D and the gate E contains an offset R, which relatively sets the vertical sides L L and M M of the front and back members apart, respectively, forming a pocket therebetween for the reception of the plates N. (See Fig. 2.) The back member below the pintles I and also the front or gate member are U-shaped, and each comprise the vertical side portions above referred to and an integral horizontal bottom portion P and P', respectively. The sides and bottom of each the said back and front register with each other, and when the vertical sides L L are brought up against the plate the said sides are directly opposite the sides M M of the back. If preferred, the plates may be provided with a pair of vertical grooves G on each side (see Fig. 6) to receive the vertical portions of the frame.

A suitable hook Q is pivoted to the horizontal portion P' of the back U-shaped part of the holder and is adapted to engage the corresponding portion P of the front or gate member in a way to snugly hold the gate closed upon the plates N, as indicated in full lines in Fig. 2. For the removal of the plates the operator simply has to release the said hook, whereupon the gate member of the holder readily springs open and allows the plates to drop out, when new ones can be replaced.

The form shown in Figs. 3 to 6, inclusive, is a two-part holder, one adjoining either edge and each of a like construction and containing vertical members L and M to engage the opposite side faces of the plate. In this form the back members and the clamping member M are formed integral and contain a coil-spring hinge S at the lower end to permit the front M to open to receive the plates. The upper end of the said front extends in at a right angle and is further bent to form an engaging hook T to engage the shank portion of the back, as is clearly shown in Figs. 4 and 6.

The shank portions F of my holder may be provided with an insulating-sleeve W of the usual construction, if desired, and as is clearly shown in the drawings. It will further be apparent that my holder can be made shorter or longer, as desired, to accommodate a single plate or a greater number of plates than that shown in the drawings, and its usefulness need not be confined to two, as indicated.

Having thus described my invention, what I claim, and desire to secure by Letters Patent, is—

1. A battery-plate holder of the class described, comprising a pair of spaced back supports to engage the outer surfaces of the back of a plate, a front member hinged to said plate and means to hold said members in a closed position to clamp a plate.

2. A battery-plate holder of the class described, comprising a fixed vertically-disposed wire support to engage the back face of a plate, and a front wire support hinged to and registering with said back and adapted to yieldably engage the front of the plate directly opposite from said back members.

3. A battery-plate holder of the class described, comprising a pair of spaced back supports to engage the rear side of a plate, a pair of spaced front supports hinged to said back supports to engage the front of a plate and means to hold said supports closed against a plate.

4. In a battery-plate holder, the combination with a cover, of a U-shaped wire frame attached thereto, a U-shaped gate member hinged to said U-shaped frame, a plate intermediate said U-shaped members and means to lock said gate in its closed position against the plate.

5. A battery-plate holder of the class described, comprising a back formed of wire bent to form two supports to engage the one side of a plate, a second pair of wire supports hinged to the before-mentioned supports and adapted to engage the opposite face of the plate, and means to lock a plate intermediate such supports.

6. In a battery-plate holder, the combination of depending wire supports having angular bends therein forming horizontal pintles, a U-shaped wire-clamping member hinged to the pintles of said supports, and means to lock said gate in a closed position against the gate.

7. A holder of the class described formed of wire, and comprising a back supporting member, a front member hinged to said back, a compressed negative element having grooves to be engaged by said front and back members, and means to hold said members in a closed position against the said elements.

8. A holder of the class described, and comprising a back formed of wire threaded for attachment to a cover and bent to form pintles, a second wire member hinged to said pintles bent to clamp a plate when closed, and means to hold said members in a clamped position.

Signed at Waterbury, in the county of New Haven and State of Connecticut, this 10th day of June, A. D. 1905.

WILLIAM G. C. KRAUSE.

Witnesses:
C. M. NEWMAN,
C. B. SCHOENMEHL.